United States Patent

[11] 3,626,305

| [72] | Inventors | Harold P. Furth;<br>Marshall N. Rosenbluth, both of Princeton, N.J. |
|---|---|---|
| [21] | Appl. No. | 794,314 |
| [22] | Filed | Jan. 27, 1969 |
| [45] | Patented | Dec. 7, 1971 |
| [73] | Assignee | The United States of America as represented by the United States Atomic Energy Commission |

[54] HIGH ENERGY ION ACCELERATOR
2 Claims, 7 Drawing Figs.

[52] U.S. Cl. .................................................. 328/233,
313/63, 313/161, 328/237
[51] Int. Cl. .................................................. H01j 1/50,
H05h 1/00

[50] Field of Search............................................. 328/233,
237; 313/63, 161; 315/111; 176/3

[56] References Cited
UNITED STATES PATENTS

| 3,485,716 | 12/1969 | Bodner........................ | 315/111 X |
| 2,992,345 | 7/1961 | Hansen......................... | 313/161 X |
| 3,036,963 | 5/1962 | Christofilos.................. | 313/161 X |

*Primary Examiner*—Roy Lake
*Assistant Examiner*—Palmer C. Demeo
*Attorney*—Roland A. Anderson ABSTRACT: Static field accelerator for transferring energy from an electron ring to ions confined therein whereby the ions are efficiently accelerated to high energies in a short distance.

*INVENTOR.*
HAROLD P. FURTH
BY MARSHALL N. ROSENBLUTH

INVENTOR.
HAROLD P. FURTH
BY MARSHALL N. ROSENBLUTH

INVENTOR.
HAROLD P. FURTH
BY MARSHALL N. ROSENBLUTH

HIGH ENERGY ION ACCELERATOR

BACKGROUND OF THE INVENTION

This invention was made in the course of, or under a contract with the United States Atomic Energy Commission.

In the field of physics it is desirable to accelerate ions to high energies by the use of the strong fields associated with a dense cluster of electrons. As described on page iii, et seq. of UCRL 18103, various methods and apparatus have been proposed and used to this end, e.g., wherein the ions are trapped by the collective field produced by a gyrating ring of relativistic electrons capable of accelerating the ions to an energy of 1 or more GeV per nucleon. The systems known heretofore, however, have required radiofrequency cavities or pulse line techniques for accelerating the ions to this energy. It has also been proposed to use static magnetic fields for acceleration, but in previous designs the magnetic field strength has been uniform over the area of the electron ring, which leads to conservation of the magnetic moment of the ring electrons, and is unsuitable for ion acceleration to more than a few GeV. It is also desirable to provide an efficient and practical focusing system for electron ring accelerators.

SUMMARY OF THE DISCLOSURE

In accordance with this invention, it has been discovered that static magnetic fields can be used to convert initial electron-ring energy into axially directed kinetic energy of ions in the range of 10 GeV or more, so as to avoid many of the complexities of the electron ring accelerators, known heretofore. In one embodiment, this invention comprises an annular, cylindrical vacuum chamber for receiving and transporting a ring of gyrating electrons containing ions, and inner and outer coaxial solenoid means disposed respectively in spaced apart relation adjacent the inside and outside diameters of the chamber and in which the DC energy is graded differently for producing a static, nearly unidirectional magnetic field whose strength varies axially in the chamber for moving the ring of gyrating electrons and ions therein without the conservation of magnetic moment so as to avoid enlarging the radius of the ring, for exchanging energy from the ring to the ions contained therein as the ring moves axially in the chamber whereby the ions are efficiently accelerated to high energies in a short distance in said chamber. In another aspect this invention provides for focusing and controlling the radius of an electron ring to decrease in the electron ring accelerator. With the proper selection of components and their arrangement, as described in more detail hereinafter, the desired electron ring accelerator is provided.

The above and further objects and novel features of this invention will appear more fully from the following detailed description when the same is read in connection with the accompanying drawings. It is expressly understood, however, that the drawings are not intended as a definition of the invention but are provided for the purposes of illustration only.

BRIEF DESCRIPTION OF THE DRAWINGS

In the drawings where like elements are referenced alike.

DETAILED DESCRIPTION OF THE PREFERRED EMBODIMENT

Figure 1:
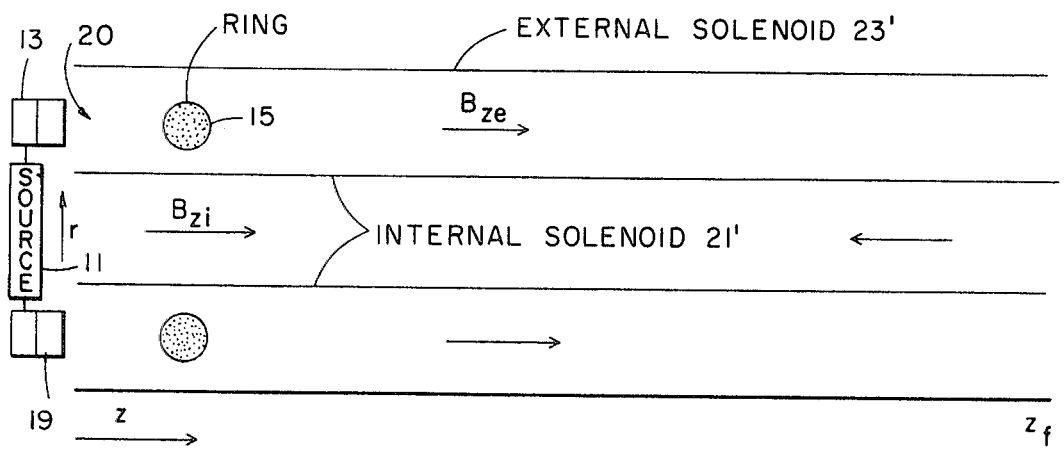
FIG. 1 is a partial schematic drawing of the principles of this invention.

This invention is useful in accelerating ions, such as protons or heavier positively charged particles, to high energies and is particularly advantageous in the fields of physics for impacting high energy ions against suitable targets, and in nuclear chemistry for the production of nuclides and/or transuranium elements. However, this invention may be used in any application where high energy ions are useful, and to this end this invention may be used as a principal accelerator means or as an injector for conventional high energy accelerators. Likewise, the static field electron ring accelerator system of this invention can be used for preacceleration of electron rings to very high axial velocities before injection into an RF accelerator stage therefor.

To this end, this invention utilizes a ring of gyrating relativistic electrons having, in one example, an initial energy of 200 Mev., a total number of electrons of $10^{15}$, a major radius of 15 cm., a minor radius of 1 cm., and having about $7 \times 10^{12}$ ions imbedded in the electrostatic well provided by the electrons. Such a ring can be produced, for example, by rapid betatron acceleration of an injected ring of lower electron energy, for example, 10 Mev. Such a lower energy ring and various apparatus and methods for providing the same are within the skill of the art as described in UCRL 18103, which is incorporated by reference herein, but for completeness, a brief description of one system for producing the ring of electrons is clearly and definitely provided hereinafter. Various schemes for producing such electron rings date back to the 1967 Int. Conf. on Accel., where Veksler proposed a circulating ring or toroid of energetic electrons and since that time actual rings of relativistic gyrating electrons having high currents in a small radius filament have actually been provided for trapping the ions in the interior of the toroid.

In this regard, it is known that intense sources of relativistic electrons are available for injection into a suitable vacuum chamber. For example, as described on page 104 of UCRL 18103, the Astron electron gun produces electrons having an energy of 4 Mev. ±80 keV., with a pulse length of 250 ns, N in $10^{-2}$ rad-cm. of $3 \times 10^{14}$ and N in 40 ns of $4.8 \times 10^{13}$.

It is also known that these electrons can be injected into a compressor unit by a multiturn injection system, as shown and described on pages 97, 106 et seq., of the above-cited UCRL report. In this injection system described in this above-mentioned report, the beam from the electron gun is brought into the compression chamber through a field-free region provided by eddy currents in a copper tube. The injection radius is 20 cm., the field is 750 gauss, and the $n$-value is about 0.6. The method involved utilizes a closed orbit, distorted outward at the inflector, that is produced by a region of weak field located diametrically opposite the inflector with radial betatron tune ($\nu_r$) of two-thirds. The beam is inflected with an amplitude of collective betatron oscillation sufficient to clear the inflector for two turns with a two-third radial tune. The field perturbation is then turned off in 3 turns (12 nanoseconds) leaving a circular closed orbit that has thus been moved away from the inflector.

As described on page 91 et seq., of the above-cited report, one method of capture in the compressor utilizes an unstable fixed point considered as the reverse of multiturn resonant extraction. In this method the injected beam spirals inward for several turns, approaching a radially unstable circular orbit, before tending to spiral back out, the time of several turns being long enough conveniently to change the fields so as to capture the injected beam.

In the compressor, which comprises three sets of decreasing diameter magnetic mirror coils, as shown on page 96 of the above-cited report, the compression sequence begins at the injection radius of 20 cm., where the energy is 4 Mev., and the field strength is 750 gauss. Only the outer coil (coil 1) is energized until the radius of the injected ring of electrons therein shrinks to 17.5 cm., at which point in time this coil is clamped (shorted). Coil 2 is then energized until the radius of the electron ring shrinks to 9 cm., at which point in time, this coil 2 is clamped. Then coil 3 is pulsed until the electron ring compresses to a radius of 3.5 cm., at which point in time the energy of the electrons therein is 20 Mev., and the ring is ready for loading with protons or heavy ions.

Among the methods preferred for this loading of the electron ring is the one in which a puff of gas spreads throughout the vacuum chamber of the compressor, which is rapidly pumped to maintain a vacuum of $10^{-3}$ torr or better. The loading of the ring is thus advantageously controlled by the amount of gas released into the compression chamber, which takes place for example, in a few milliseconds or less into a compression chamber pumped to a vacuum of about $10^{-8}$ torr or better.

Advantageously, a suitable set of magnetic coils are pulsed axially to shift the ring into the apparatus of this invention. To this end five coils with equal radius (R=1) are used having spacing between the coils equal to the coil radius. After compression in the above-described compressor section, the electron ring is trapped in the magnetic mirror formed by coils 1 and 4 of this set at Z=0 as shown by curve I on page 331 of the above-cited report. When coils 2 and 5 of this set are excited slowly, the minimum $B_z$ moves slowly towards positive values of Z. This operation is performed slowly enough to make the electron ring follow the minimum $B_z$ adiabatically. Curve II of the cited report shows the situation when the currents in the coils 1, 2, 4 and 5 have become equal to center the ring around Z=0.5. Then the current in coils 1 and 4 slowly goes to zero current density to move the electron ring at Z=1 from its original position whereby the ring is ready for the main stage of energization, using the betatron acceleration principle, wherein the electrons are raised to high energies of typically hundreds of Mev. and the ions are given approximately equal and opposite angular momentum, which is the appropriate initial condition for the axial ion-acceleration stage, in the standard configuration of FIG. 1.

Figure 2:
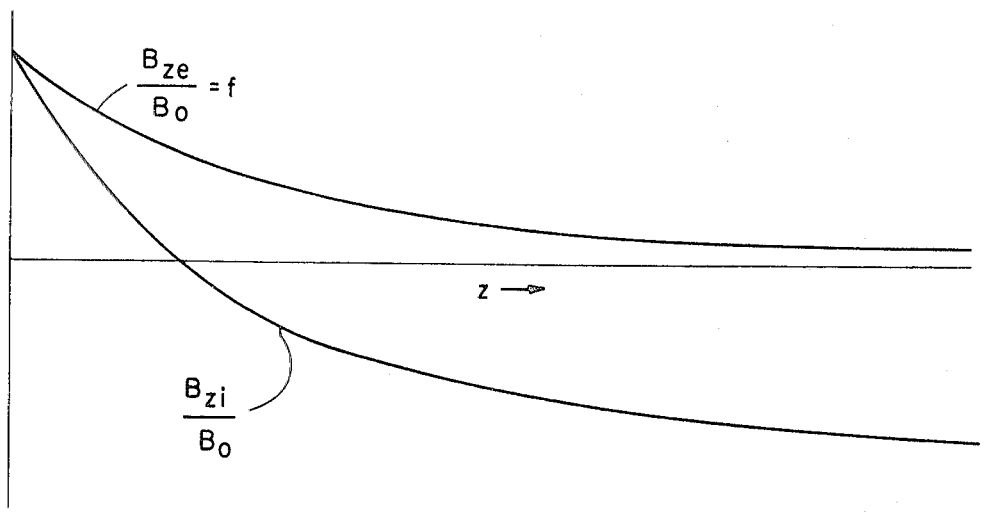
FIG. 2 is a graph illustrating the basic geometry of the magnetic fields produced by the inner and outer solenoids of FIG. 1.
Figure 7:
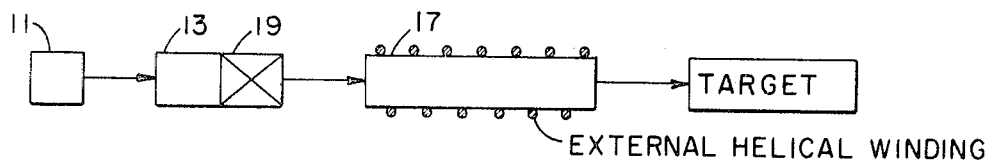
FIG. 7 is a partial two-dimensional view of another embodiment of a focusing system for the apparatus of FIG. 3.

The basic principles of the accelerator of this invention are illustrated by the axisymmetric electron ring accelerator of FIG. 1, since the simplest approach for the purpose of illustration is to maintain axisymmetry, while controlling the magnetic flux within the orbit of the electrons in the described conventional relativistic electron ring independently of the magnetic field at the orbit as in a betatron. In this regard, as will be understood in more detail hereinafter, inner and outer solenoids are provided with DC energy therein graded differentially so as to decrease along the axis of the vacuum chamber at different rates in each solenoid, as illustrated in FIG. 2.

The basic equations for such devices are the following. Conservation of canonical angular momentum gives us for a centered electron orbit.

$$r^2 B_z(r, z) = \frac{\phi(r, z)}{2} + B_o r_o^2 - \frac{\phi_o}{2} \quad (1)$$

where $$\phi = 2 \int_0^r dr_1 r_1 B_z(r_1, z) \quad (2)$$

$$r = \frac{v_\theta B_o}{v_{\theta o} B_z} r_o \quad (3)$$

and the zero subscript refers to the values of $B_z$ and $\phi$ at $r=r_o$, $z=0$. Neglecting the ions for the moment, we use the energy-conservation equation $$c^2 - v_\theta^2 - v_z^2 = \frac{c^2}{\gamma^2} = c^2 - v^2 \theta_o \quad (4)$$

combined with Eq. (3) to give:

$$\frac{1}{[1-(v_z^2/c^2)]^{1/2}} = \gamma_z = \frac{B_o r_o}{B_z r} \left[1 + \frac{1}{\gamma^2}\left(\frac{B_o^2 r_o^2}{B_z^2 r^2} - 1\right)\right]^{-1/2} \quad (5)$$

The case of principal interest is $\gamma_z^2 \ll \gamma^2$, so that the end value after acceleration may be written simply:

$$\gamma_{zf} = \frac{B_o r_o}{B_f r_f} \quad (6)$$

where the subscript $f$ refers to the end position of the orbit. If we require magnetic moment conservation, then $$B_o r_o^2 = B_f r_f^2 \quad (7)$$

$$\gamma_{zf} = \left(\frac{B_o}{B_f}\right)^{1/2} = \frac{r_f}{r_o} \quad (8)$$

This means that the electron ring expands rapidly as it accelerates along the axis, so that its electric field diminishes and becomes incapable of accelerating the ions effectively. On this basis it has been estimated on page 174 of UCRL 18103 that such a static-field accelerating method is unsuitable for producing ions of more than 4 Gev. per nucleon.

Magnetic moment conservation is inevitable in an axisymmetric coil system without internal solenoid, such as has been envisaged in previous schemes for static-field acceleration of electron rings. Therefore the use of static-field acceleration has been considered unsuitable for the attainment of ion energies above 4 Gev.

In the present invention, the conservation of magnetic moment is avoided by means of the internal solenoid. Then the relation between B and r becomes arbitrary, and we may elect to expand $r$ to a lesser extent or even to reduce it or modulate its z-dependence. A convenient choice for analysis is to hold $r$ constant, so that $$\gamma_{zf} = B_o/B_f \quad (9)$$

For simplicity, we will confine ourselves to $r$=const. orbits in what follows. This is the case illustrated in FIGS. 1 and 2. The internal solenoid must be wound so as to satisfy eq. (1). To see the gross feature of the flux-plumbing, we approximate the orbit as lying just within a constant, external axial field $B_{ze}$ and just outside a constant internal magnetic field $B_{zi}$. The eq. (1) implies $$B_{ze} - \frac{B_{zi}}{2} = \text{const.} \quad (10)$$

This is satisfied conveniently by letting $B_{zi}$ pass from $B_o$ to $2B_f - B_o$ while $B_{ze}$ drops from $B_o$ to $B_f$.

More generally, the detailed magnetic-field structure near the orbit, as given by eq. (1) and by the equations $\nabla \cdot \vec{B}=0, \nabla \times \vec{B}=0$, must obey:

$$\frac{\partial B_z}{\partial z} = -\frac{B_r}{R_o} \quad (11)$$

$$\frac{\partial B_z}{\partial r} = 0 \quad (12)$$

$$\frac{\partial B_r}{\partial z} = \frac{\partial B_z}{\partial r} \quad (13)$$

To first order in $r_1 = r - r_o$ we then have $$B_z = B_o\{f(z) - r_o r_1 f''(z)\} \quad (14)$$

$$B_r = -B_o r_o f'(z) \quad (15)$$

with $f(z)$ arbitrary.

As far as the unperturbed orbit is concerned, we can thus describe a static-field accelerator capable of reaching very high $\gamma_{zf}$ in a magnetic field structure of reasonable design.

Figure 3:
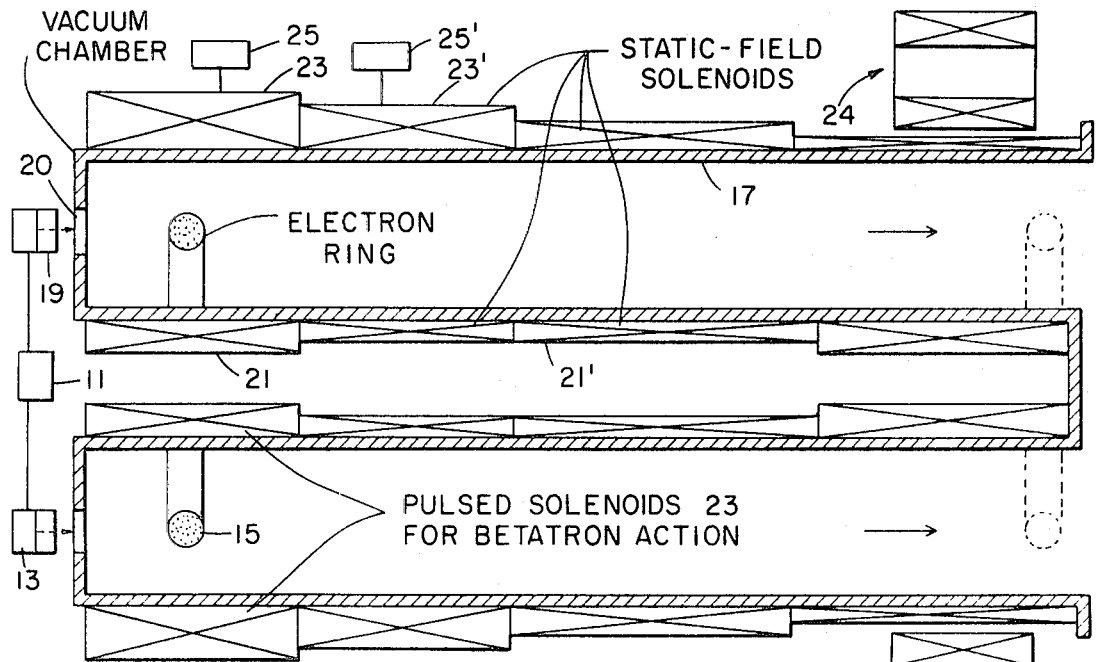
FIG. 3 is a partial cross section of a practical embodiment of an ion accelerating apparatus incorporating inner and outer solenoids for producing the magnetic fields of FIG. 2.

Referring now to FIG. 3, in a practical embodiment of this invention for producing a final proton energy of 30 Gev. corresponding to a $\gamma$ value of 33, $10^{15}$ electrons are ejected from gun 11 into compressor 13 where the electron ring 15 is formed and compressed, as described above, for ejection therefrom by coil means 19 into an annular cylindrical vacuum chamber 17 through an appropriate annular channel 20 in one end thereof and corresponding in size to the ring diameter and minor radius at injection into chamber 17. Thereupon, the ring energy is raised by betatron action in an inner pulsed solenoid 21 and an outer pulsed solenoid 23 disposed coaxially in spaced-apart relation adjacent to the inner and outer diameters of vacuum chamber 17 so as to dispose the chamber 17 between the solenoids. To this end, solenoids 21 and 23 have a suitable pulsed current source 25. Advantageously, this increased energy is 200 Mev. ($\gamma$=400) to carry a current of 50 K-amp with $10^{15}$ electrons, a major radius of 15 cm., an initial minor radius of 1 cm., and $7\times10^{12}$ protons therein with an initial energy of 20 Mev. To this end, the inner and outer solenoids 21 and 23 produce a time-rising magnetic field of 50 kilogauss. Thereupon, inner solenoid 21' and outer solenoid 23', which are disposed coaxially with each other and with chamber 15 and are about 100 meters-long, produce a static magnetic field graded as illustrated in FIG. 2 to provide an electric field in ring 15 corresponding to 3 Megavolt/cm.

In the embodiment illustrated in FIG. 3, the solenoids 21, 23, 21' and 23' are made by conventional techniques with normal resistance conductors, although superconductors, as described e.g., in the Mar. 1967 Scientific American may alternately be used. The weight of the internal solenoid can be supported by the mechanical strength of the vacuum chamber surrounding the internal solenoid. This approach is particularly suitable for short accelerators and for a vertical accelerator axis. For long, horizontal accelerators, it is appropriate to support the weight of the internal solenoids by means of magnetic pressure. For this purpose, steady support magnetic fields can be used which are turned off transiently during the very short times (a few microseconds) when the accelerator is actually passing an electron ring, so as not to perturb the ring trajectory. The magnetic support pressure is applied directly to the internal solenoid by means of the support solenoids 24, of which the upper carries current in the direction opposite to that of the current in the tip of the internal solenoid, while the lower carries current in the same direction.

The axial variation of the currents in the inner and outer solenoids 21' and 23', which are provided by conventional DC sources such as power source 25', is as follows. The expression for the ion energy as a function of axial position is to a good approximation $$M\gamma_z c^2 = Mc^2 + eEz \quad (16)$$

where $E$ is the accelerating electric field due to the electrons. Remembering that the magnetic field at the orbit is $$B_{ze} = B_0 f(z) \approx B_0/\gamma_z \quad (17)$$

we find from (16) and (17)

$$f(z) = \frac{1}{1 + \frac{z}{z_f}(\gamma_{zf} - 1)} \quad (18)$$

where $0 \leq z \leq z_f$, and $z_f$ is the length of the accelerator.

The magnetic field in the internal solenoid is given by $$B_{zi} = 2B_{ze} - B_0 \quad (19)$$

$$= B_0(2f - 1) \quad (20)$$

Thus we have the final result that the current per unit length in the outer solenoid is given by $$I_o = \frac{B_{zo}}{4\pi} = \frac{B_0}{4\pi} f(z) \quad (21)$$

The current per unit length in the inner solenoid is given by $$I_i = \frac{B_{zo} - B_{zi}}{4\pi} = \frac{B_0}{4\pi}[1 - f(z)] \quad (22)$$

while $f(z)$ is given to a good approximation by (18). For our example, $B_0/4\pi$ is about 40 k.amp./cm.

The axial focusing of the electron ring 15 having ions therein, as described above, is taken care of by self-focusing, as long as $N_i/N_e \geq 0.007$, since the ring self-focuses if the number protons ($N_i$) satisfies $N > ZN_i > N/\gamma^2$ where Z equals the charge of the ion.

Figure 4:
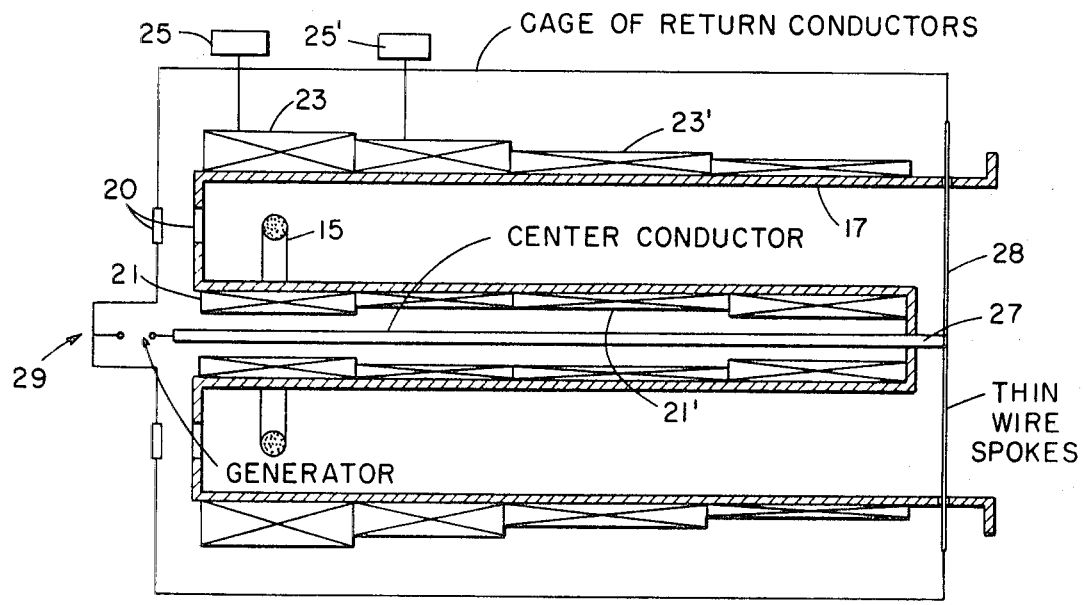
FIG. 4 is a partial cross section of a focusing system for the apparatus of FIG. 3.

Radial focusing on the other hand is provided for in accordance with one embodiment of this invention by an auxiliary $B_\theta$ magnetic field provided by an internal centrally located conductor 27 extending longitudinally along the axis of the vacuum chamber 17, and connected to wire spokes 28 arranged to radiate equally around conductor 27 as shown in FIG. 4. The conductor 27 also has a suitable DC power source. This conductor 27 produces an outward $B_\theta$ magnetic field against the electrons in ring 15 that balances the inward force due to the magnetic field $B_{ze}$ from the outer solenoid 23, thereby to improve the radial focusing of ring 15.

In this regard, for $\gamma^2 \gg 1$, the equilibrium electron orbit is given by $$f\frac{r}{r_0} = u_e = \frac{\epsilon(1 - u_e^2)^{1/2}}{u_e} \quad (23)$$

(where we do not restrict ourselves to the standard case $r \equiv r_0$ of FIGS. 1 and 2), where $u_e \equiv v_{\theta e}/v_{\theta e0}$, $f \equiv B_{ze}/B_0$, and $\epsilon \equiv rB_\theta/r_0B_0$.
To a good approximation, we have $$u_e = \frac{1}{\gamma_z} = \frac{1}{1 + \frac{z}{z_f}(\gamma_{zf} - 1)} \quad (24)$$

and eqs. (23) and (24) then give the prescription for the axial variation of $f(z)$. In the case $r \equiv r_0$, we obtain the current densities in the inner and outer solenoids from eqs. (21) and (22). The basic trend is that initially $f$ drops down from 1, just as in the standard case where $B_\theta \equiv 0$; then $f$ rises again. It is economically convenient that $fr/r_0$ should not rise above 1 toward the end of the accelerator. Since we have approximately $$\frac{r_f}{r_0}f(z_1) = \frac{\epsilon}{u_{ef}} = \epsilon\gamma_z \quad (25)$$

it is appropriate to take $\epsilon \approx 1/\gamma_{zf}$. For our numerical example, this means that $B_\theta$ at the orbit is 1.5 kilogauss, and so a current of 110 k.amp. along the axial conductor in FIG. 4 is required.

In the case of initial radial deviations $\delta r_0$ due to energy scatter, the radial deviation as a function of $z$ is given by eq. (24) and $$\delta r = \delta r_0 \left\{ 1 - \frac{\epsilon}{u_e^2} \frac{1 - \frac{r}{r_0}u_e}{(1 - u_e^2)^{1/2}} \right\} \quad (26)$$

For the model of FIG. 4, where $r \equiv r_0$, we then have to a good approximation $$\delta r = \delta r_0 \left\{ \frac{1 - \frac{\epsilon}{u_e^2}}{u_e + \frac{\epsilon^2}{u_e^3}} \right\} \quad (27)$$

From this we see that there are two maxima of $|\delta r/dr_0|$. At $u_e^2 = 3.7\epsilon$, $$\delta r = \frac{.38}{\epsilon^{1/2}} \delta r_0 \quad (28)$$

At $u_e^2 = .27\epsilon$, $$\delta r = \frac{-.38}{\epsilon^{1/2}} \delta r_0 \quad (29)$$

Figure 5:
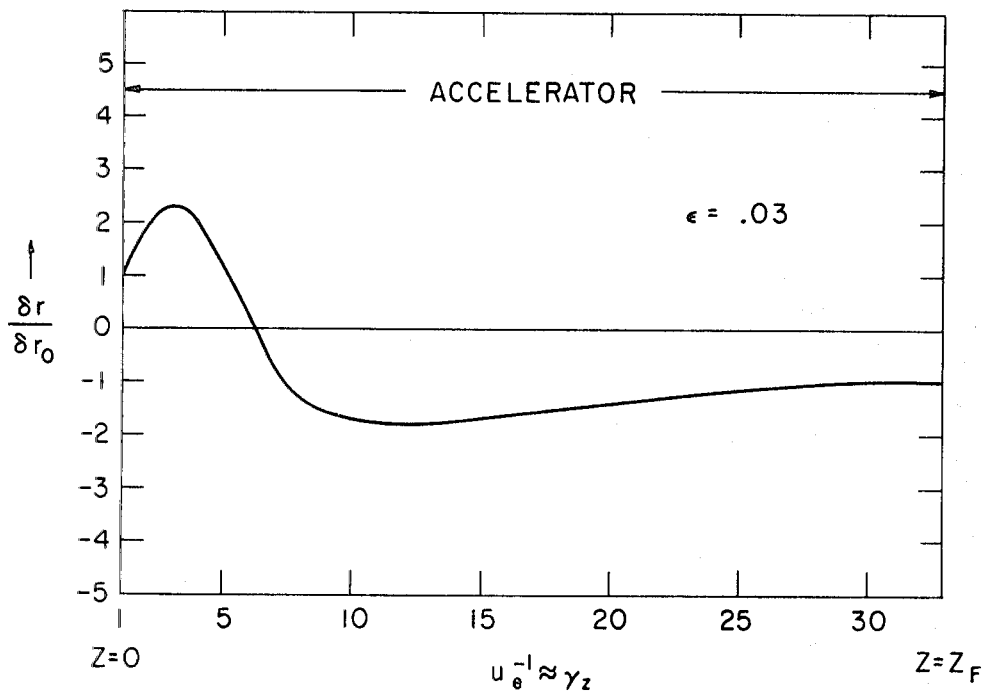
FIG. 5 is a graphic illustration of parameters of the embodiment of FIG. 4.

The results of an exact calculation, using eq. (26) for $r \equiv r_0$ and $\epsilon = 0.03$ are given in FIG. 5. This choice of $\epsilon$ corresponds to our numerical example, where $u_{ef} = 1/\gamma_{zf} = 0.03$. The worst deviations are $\delta r = 2.3\delta r_0$ and $\delta r = -1.8\delta r_0$, which agrees roughly with the approximate equations (28) and (29).

These results are far better than the deviation $\delta r_f = 33\delta r_0$ which would have been obtained without B .

For the case of initial radial deviation $\delta a_o$ due to angular scatter of the electron orbits, we find for the variation of $\delta a$ with $z$ $$\delta a = \delta a_o \frac{\left(\frac{r}{r_o}\right)^{1/2}}{\left(u_e^2 + \frac{\epsilon^2}{u_e^2}\right)^{1/4}} \quad (30)$$

For the model of FIG. 4, where $r = r_o$, we then have for the maximum deviation, which comes at $u_e^2 = \epsilon$, $$\delta a = \delta a_o/(2\epsilon)^{1/4} \quad (31)$$

for $\epsilon = 0.03$, this means $\delta a = 2\delta a_o$. This is far better than the deviation $\delta a_f = 6\delta a_o$ which would have been obtained without $B_\theta$.

When introducing the $B_\theta$-field, we must note that its presence will affect the ion equilibrium orbit. The effect of the B on ion focusing is much less important, since electrostatic forces clearly predominate in this case. For the equilibrium, electrostatic forces are also helpful in keeping the ion and electron radii together, but in addition one must seek to obtain nearly equal radii to first approximation by purely magnetic means. This can be done to a large extent by choosing the initial ion angular momentum $Mv_{\theta\,io}r_o$ appropriately.

$$Mv_{\theta\,io} = m\gamma c(-1+\delta). \quad (32)$$

For the standard case of $B_\theta = 0$, the choice $\delta = 0$ makes the ion and electron orbits coincide. In the case $B_\theta \neq 0$, $\delta$ is our free parameter. The ion orbit equation is $$\delta^2 \left(\frac{r_o}{r}\right)^2 u_e - \delta \frac{r_o}{r} u_e^2 + \epsilon\sqrt{1-u_e^2}\left(\delta\frac{r_o}{r} - u_e - \frac{M}{m\gamma}\right)$$
$$= \frac{M}{m\gamma} u_e \frac{r}{r_o} G \quad (33)$$

where G is a measure of the electrostatic force $eE$ (in the ring frame) that needs to be applied to keep the ions to the same orbit radius as the electrons $$G = eEr_o/m\gamma c^2 \quad (34)$$

It is desirable to minimize the number $G_{max} > |G|$, and in particular not to let it approach 1. (For the present numerical example, $G_{max}$ can be at most 0.25).

In satisfying (33) for the standard model $r = r_o$, $\epsilon = u_{ef}$, the main problems occur at the beginning and end of the acceleration process. We need to satisfy simultaneously $$\left|\delta^2 - \delta\right| \leq \frac{M}{m\gamma} G_{max} \quad (35)$$

$$\left|\delta^2 - \frac{M}{m\gamma} + \delta\right| \leq \frac{M}{m\gamma} G_{max} \quad (36)$$

For our numerical example, we have $M/m\gamma = 4.5$, and we find that the choice $\delta = 1.5$ gives $G_{max} = 0.17$. While this is apparently acceptable, it is uncomfortably large, and we consider in the next section how to improve the situation by varying the ring radius as a function of $z$. (It should also be noted that a considerable improvement in focusing can be obtained according to eq. (26), even if $\epsilon$ is not taken as large as $u_{ef}$, and in that case the undesirable effect of the $B_\theta$-field on the ion orbit is reduced accordingly).

Figure 6:
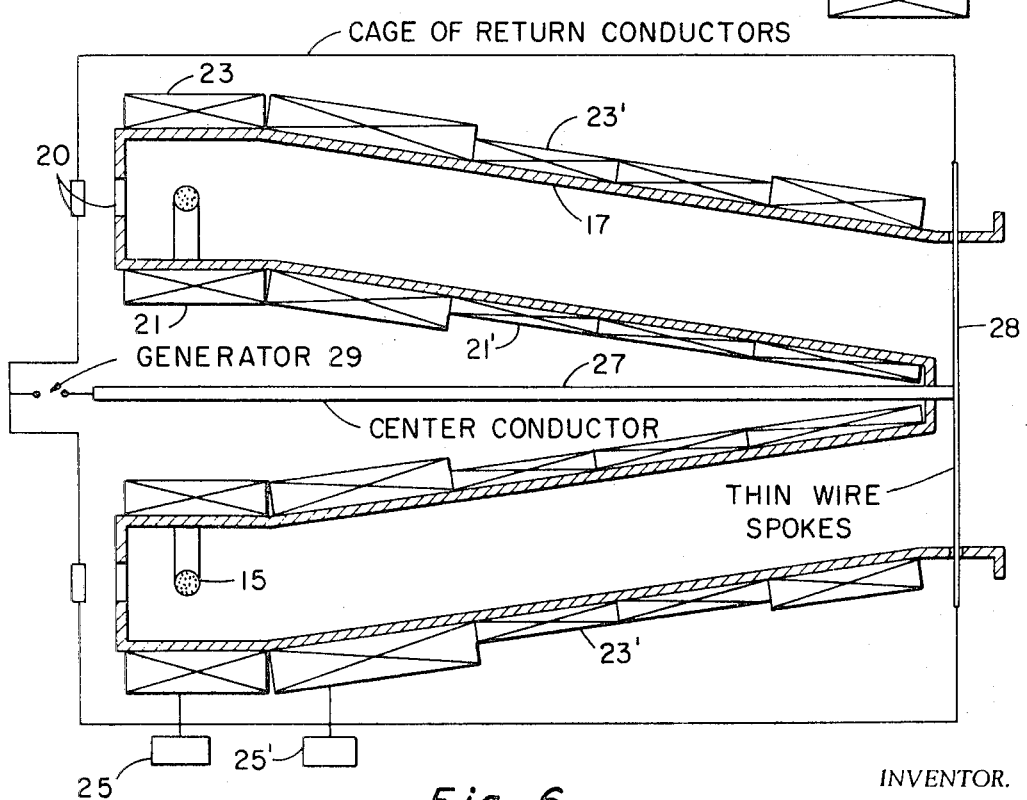
FIG. 6 is a partial cross section of another embodiment of the accelerator of this invention in accordance with the principles of FIG. 1.

In varying the orbit radius in accordance with this invention, the basic equations of the ring motion allow $r(z)$ to be an arbitrary function of $z$. (We have assumed, however, and will continue to assume, for convenience, that the axial variation of the orbits is sufficiently gentle so that radial acceleration terms in $\ddot{r}$ can be neglected in the orbit equation). Thus the question of how to optimize $r(z)$ remains to be settled on the basis of focusing, ring stability, and other technical considerations. The standard case $r = r_o$ is by far the simplest for analysis, and the simplest for construction. However, we wish to discuss some advantages of the alternate design illustrated in FIG. 6.

If the ring radius is reduced as it is accelerated, one outstanding advantage is that the line density of the ring (i.e., the number of electrons per unit circumferential length) is increased. Thus one can hope to increase the ring electric field during acceleration, instead of having it maximal in the beginning, and then letting it drop off due to defocusing of the ring. The point here is that the larger the ring electric field is, the better for shortening the accelerator, but the more danger there is of ring instability. If the electric field is excessively large during the final stages of ring acceleration, there is little time for instabilities to grow and so one can go to very large electric fields. On the other hand, in the standard case, where the ring electric field is largest in the beginning, there is ample time even for weak instabilities to grow, and so one is limited to much lower maximum electric fields and therefore longer accelerators.

A second advantage of varying $r(z)$ appears in connection with controlling the ion orbit in the presence of $B_\theta$. If $r \neq r_o$ in eq. (33) there is more freedom to reduce $G_{max}$. Thus we obtain instead of eq. (36) the condition $$\left|\delta^2 - \left(\frac{r_o}{r_f}\right)^2 \frac{M}{m\gamma} + \delta \frac{r_o}{r_f}\right| \leq \frac{M}{m\gamma} G_{max} \frac{r_f}{r_o} \quad (37)$$

For $r_f \ll r_o$, this can be satisfied simultaneously with (35) by going to $\delta \sim (r_f/r_o)(M/m\gamma)^{1/2}$; and then $G_{max} \sim (r_f/r_o)(m\gamma/M)^{1/2}$, which is small. (With this type of orbit, deviations of the ion and electron radii can however become important at points of the trajectory other than the beginning and end, and $r(z)$ must be designed accordingly.)

A relative disadvantage of reducing $r$ as a function of $z$ appears in connection with the focusing equations (26) and (30). We see that the radial deviation $\delta r$ due to energy spread remains nearly constant as the radius is reduced, while the radial deviation $\delta a$ due to angular spread diminishes only as $(r/r_o)^{1/2}$. Thus the focusing factor $\delta r/r$ deteriorates in both cases if $r$ decreases below $r_o$. (We note, however, that the absolute ring cross section, at least, is not increased by the decrease in $r/r_o$. Therefore, the ring electric field increases with $r_o/r$, as mentioned earlier).

For the case where $r$ is not constant, the magnetic field $B_{zi}$ from the inner solenoid 21' is given by a more general equation that (19). We now have $$B_{zi} = \frac{r_o^2}{r^2}\left[B_{zio} + 2B_o\left(\frac{r}{r_o}u_e - 1\right)\right] \quad (38)$$

To keep $B_{zi}$ from becoming large at $z = z_f$, we can pick the arbitrary constant $B_{zio}$ so that $B_{zif} = 0$. For $r_f \ll r_o$ we then have $B_{zio} = 2B_o$, $$B_{zi} = \frac{r_o}{r} B_o u_e. \quad (39)$$

To obtain the prescription for $B_{ze}$ we use (23). The current densities in the inner and outer solenoids then follow from (21) and (22).

While this invention has been described above with reference to axisymmetric magnetic field structures it will be understood from the above that the conservation of magnetic moment in the electron ring 15 in accordance with this invention can also be achieved by a nonaxisymmetric magnetic field structure. In such an embodiment, helical multipole windings having conventional conductor characteristics and employing conventional winding techniques developed in connection with the C Stellarator at Princeton University, superimpose on the axial magnetic field a nonaxisymmetric magnetic field with the same pitch as the electrons thereby to vitiate magnetic-moment conservation so as to give rise to an axial acceleration (dependent on the phase of the electrons with respect to the helical winding).

Also while this invention has been described in several embodiments and the actual parameters for a preferred embodiment have been given, it is understood that these parameters may be varied by one skilled in the art to effectuate the principles of this invention without departing from the spirit and scope thereof.

This invention has the advantage of efficiently producing protons or heavier ions in the 10–100 Gev. energy range by relatively simple and small accelerators. To this end, this invention uses a static magnetic field to convert the energy of electrons within plasma entities into energy of ions. Moreover, by accelerating a plasma ring that is coaxial with an interior and exterior solenoid in which the DC energy is graded differently, it is possible in accordance with this invention to accelerate the ring in a static magnetic field without at the same time enlarging the ring. Likewise, the structure of this invention provides higher energies and avoids the difficulties of previous schemes that require RF fields for acceleration, that enlarge the ring during acceleration, that involve simple mirror machine expansion from strong to weak, wherein the ring consists of plasma with small, nonaxis-encircling particle orbits, or wherein a time-varying magnetic field is used to put kinetic energy into the plasma.

What is claimed is:

1. An electron ring accelerating apparatus for accelerating ions in the electrostatic well provided by a ring of gyrating electrons, comprising:
   a. means forming an annular, cylindrical, vacuum chamber along a longitudinally extending chamber axis for receiving and transporting said ring of gyrating electrons containing said ions in said chamber;
   b. inner and outer coaxial solenoid means disclosed respectively in spaced apart relation adjacent the inside and outside diameters of said chamber and extending coaxially therewith along said chamber axis for producing a static magnetic field whose strength varies axially in said chamber for moving said ring of gyrating electrons and ions therein without enlarging the radius of said ring by avoiding the conservation of magnetic moment in said chamber for exchanging energy from said ring of gyrating electrons to said ions therein as said ring moves axially in said chamber, whereby said ions are efficiently accelerated in said ring of gyrating electrons to high energies in a short distance in said chamber; and
   c. a central conductor extending longitudinally inside said inner solenoid and coaxially with said inner and outer solenoids along said chamber axis for producing an auxiliary $B_\theta$ magnetic field for radial focusing of said ring of gyrating electrons.

2. The invention of claim 1 in which the circuit of said central conductor is completed by wire spokes radiating around said conductor forming an auxiliary $B_\theta$ magnetic field for radial focusing said ring of gyrating electrons.

* * * * *